US012675152B2

(12) United States Patent
Man et al.

(10) Patent No.: US 12,675,152 B2
(45) Date of Patent: Jul. 7, 2026

(54) PERFORMANCE STATE (P-STATE) MONITORING OF A PROCESSING DEVICE

(71) Applicant: QUALCOMM Incorporated, San Diego, CA (US)

(72) Inventors: Xiuting Cheng Man, Austin, TX (US); Justin Thant Hsin Oo, San Ramon, CA (US); Anatoly Gelman, San Diego, CA (US); Dipti Ranjan Pal, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 18/771,610

(22) Filed: Jul. 12, 2024

(65) Prior Publication Data

US 2026/0016882 A1     Jan. 15, 2026

(51) Int. Cl.
　　*G06F 1/3296*　　(2019.01)
　　*G06F 1/3228*　　(2019.01)
　　*G07C 5/08*　　(2006.01)

(52) U.S. Cl.
　　CPC .......... *G06F 1/3296* (2013.01); *G06F 1/3228* (2013.01); *G07C 5/0808* (2013.01)

(58) Field of Classification Search
　　CPC .... G06F 1/3296; G06F 1/3228; G07C 5/0808
　　See application file for complete search history.

(56) References Cited

U.S. PATENT DOCUMENTS

| | | | | |
|---|---|---|---|---|
| 9,658,634 B2 * | 5/2017 | Tripathi | ..................... | G06F 1/28 |
| 10,275,007 B2 * | 4/2019 | Buhot | ................... | G06F 9/4893 |
| 11,209,886 B2 * | 12/2021 | Hovis | ................... | G06F 1/3206 |

| | | | | |
|---|---|---|---|---|
| 2006/0248360 A1 * | 11/2006 | Fung | ..................... | G06F 1/3296 |
| | | | | 713/300 |
| 2010/0117579 A1 * | 5/2010 | Culbert | ..................... | G06F 1/20 |
| | | | | 318/471 |
| 2018/0336111 A1 * | 11/2018 | Gendler | ................ | G06F 1/3287 |
| 2020/0201408 A1 * | 6/2020 | Lehwalder | ................ | G06F 1/28 |
| 2020/0378287 A1 * | 12/2020 | Balthes | .............. | B01D 53/9418 |
| 2020/0409399 A1 * | 12/2020 | Vangal | ................... | G05F 1/462 |
| 2021/0081016 A1 * | 3/2021 | Hovis | ................... | G06F 1/3206 |
| 2023/0031415 A1 * | 2/2023 | Rajwan | ............... | G06F 11/3058 |
| 2024/0329722 A1 * | 10/2024 | Dahiya | ................. | G06F 1/3228 |

FOREIGN PATENT DOCUMENTS

| | | |
|---|---|---|
| CN | 113924540 A | 1/2022 |
| CN | 114450652 A | 5/2022 |

OTHER PUBLICATIONS

International Search Report and Written Opinion—PCT/US2025/033242—ISA/EPO—Nov. 7, 2025.

* cited by examiner

*Primary Examiner* — Donald J Wallace
*Assistant Examiner* — Jalal C Coduroglu
(74) *Attorney, Agent, or Firm* — Patterson + Sheridan LLP

(57) ABSTRACT

Aspects of the present disclosure provide a method at a processing device. The method may include determining to transition from a first performance state (P-state) of the processing device to a second P-state of the processing device. The method may include enabling a monitoring device to monitor a voltage value and/or a clock frequency value at the processing device during the transition from the first P-state to the second P-state, or during the second P-state. The method may include receiving alert signals from the monitoring device based on the voltage value and/or the clock frequency value at the processing device during the transition or during the second P-state exceeding a threshold value.

20 Claims, 8 Drawing Sheets

Voltage controller

Clock controller

Temperature controller

Monitoring device

Processing device

500

700

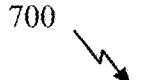

702

Determine, by a processing device, to transition from a first performance state (P-state) of the processing device to a second P-state of the processing device, wherein the first P-state indicates first values of a voltage and a clock frequency at the processing device and the second P-state indicates second values of the voltage and the clock frequency at the processing device

704

Enable, by the processing device, a monitoring device to monitor at least one of: a voltage value or a clock frequency value at the processing device during at least one of: a first period corresponding to the transition from the first P-state of the processing device to the second P-state of the processing device, or a second period corresponding to the second P-state of the processing device

706

Receive, by the processing device, one or more alert signals from the monitoring device when at least one of: at least one of the voltage value or the clock frequency value at the processing device during the first period exceeds a first threshold, or the at least one of the voltage value or the clock frequency value at the processing device during the second period exceeds a second threshold

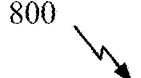

802

Receive, by a monitoring device, an indication of a transition from a first performance state (P-state) of a processing device to a second P-state of the processing device, wherein the first P-state indicates first values of a voltage and a clock frequency at the processing device and the second P-state indicates second values of the voltage and the clock frequency at the processing device

804

Transmit, by the monitoring device, one or more alert signals to the processing device when at least one of: at least one of a voltage value or a clock frequency value at the processing device during a first period corresponding to the transition from the first P-state of the processing device to the second P-state of the processing device exceeds a first threshold, or the at least one of the voltage value or the clock frequency value at the processing device during a second period corresponding to the second P-state of the processing device exceeds a second threshold

FIG. 8

PERFORMANCE STATE (P-STATE) MONITORING OF A PROCESSING DEVICE

BACKGROUND

Field of the Disclosure

Certain aspects of the present disclosure generally relate to electronic components, and more particularly to performance state (P-state) monitoring of electronic components in a vehicle control system of a vehicle.

Description of Related Art

Over the past several years, a vehicle has been transformed from a self-propelled mechanical vehicle into a powerful and complex electro-mechanical system that includes a large number of sensors and processors that control many of the vehicle's functions, features, and operations. The vehicle may be equipped with a vehicle control system, which may be configured to collect and use information from the vehicle's various systems and sensors to automate all or a portion of the vehicle's operations. For example, an advanced driver assistance system (ADAS) may automate, adapt, or enhance the vehicle's operations. The ADAS may use information collected from the sensors (e.g., accelerometer, radar, lidar, geospatial positioning, etc.) to automatically detect a potential road hazard, and assume control over all or a portion of the vehicle's operations (e.g., braking, steering, etc.) to avoid detected hazards. Features and functions commonly associated with an ADAS include adaptive cruise control, automated lane detection, lane departure warning, automated steering, automated braking, and automated collision avoidance. The vehicle monitors for errors associated with the control system, and the vehicle may notify an operator of such errors, shut down certain systems, or operate in a degraded state in response to detecting certain errors.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide the advantages described herein.

Certain aspects of the present disclosure provide a method at a processing device. The method may include determining to transition from a first performance state (P-state) of the processing device to a second P-state of the processing device, wherein the first P-state indicates first values of a voltage and a clock frequency at the processing device and the second P-state indicates second values of the voltage and the clock frequency at the processing device; enabling a monitoring device to monitor at least one of: a voltage value or a clock frequency value at the processing device during at least one of: a first period corresponding to the transition from the first P-state of the processing device to the second P-state of the processing device, or a second period corresponding to the second P-state of the processing device; and receiving one or more alert signals from the monitoring device when at least one of: at least one of the voltage value or the clock frequency value at the processing device during the first period exceeds a first threshold, or the at least one of the voltage value or the clock frequency value at the processing device during the second period exceeds a second threshold.

Certain aspects of the present disclosure provide a method at a monitoring device. The method may include receiving an indication of a transition from a first P-state of a processing device to a second P-state of the processing device, wherein the first P-state indicates first values of a voltage and a clock frequency at the processing device and the second P-state indicates second values of the voltage and the clock frequency at the processing device; and transmitting one or more alert signals to the processing device when at least one of: at least one of a voltage value or a clock frequency value at the processing device during a first period corresponding to the transition from the first P-state of the processing device to the second P-state of the processing device exceeds a first threshold, or the at least one of the voltage value or the clock frequency value at the processing device during a second period corresponding to the second P-state of the processing device exceeds a second threshold.

Certain aspects of the present disclosure provide an apparatus for operating a vehicle. The apparatus may include a processing device configured to determine to transition from a first P-state of the processing device to a second P-state of the processing device, wherein the first P-state indicates first values of a voltage and a clock frequency at the processing device and the second P-state indicates second values of the voltage and the clock frequency at the processing device; enable a monitoring device to monitor at least one of: a voltage value or a clock frequency value at the processing device during at least one of: a first period corresponding to the transition from the first P-state of the processing device to the second P-state of the processing device, or a second period corresponding to the second P-state of the processing device; and receive one or more alert signals from the monitoring device when at least one of: at least one of the voltage value or the clock frequency value at the processing device during the first period exceeds a first threshold, or the at least one of the voltage value or the clock frequency value at the processing device during the second period exceeds a second threshold.

Certain aspects of the present disclosure provide an apparatus for operating a vehicle. The apparatus may include a monitoring device configured to receive an indication of a transition from a first P-state of a processing device to a second P-state of the processing device, wherein the first P-state indicates first values of a voltage and a clock frequency at the processing device and the second P-state indicates second values of the voltage and the clock frequency at the processing device; and transmit one or more alert signals to the processing device when at least one of: at least one of a voltage value or a clock frequency value at the processing device during a first period corresponding to the transition from the first P-state of the processing device to the second P-state of the processing device exceeds a first threshold, or the at least one of the voltage value or the clock frequency value at the processing device during a second period corresponding to the second P-state of the processing device exceeds a second threshold.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein;

a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be by reference to aspects, some of which are illustrated in the appended drawings. It is to be noted, however, that the appended drawings illustrate only certain aspects of this disclosure and are therefore not to be considered limiting of its scope, for the description may admit to other equally effective aspects.

FIG. 7 depicts an example method performed at a processing device for P-state monitoring of the processing device, in accordance with certain aspects of the present disclosure.

FIG. 8 depicts an example method performed at a monitoring device for P-state monitoring of a processing device, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
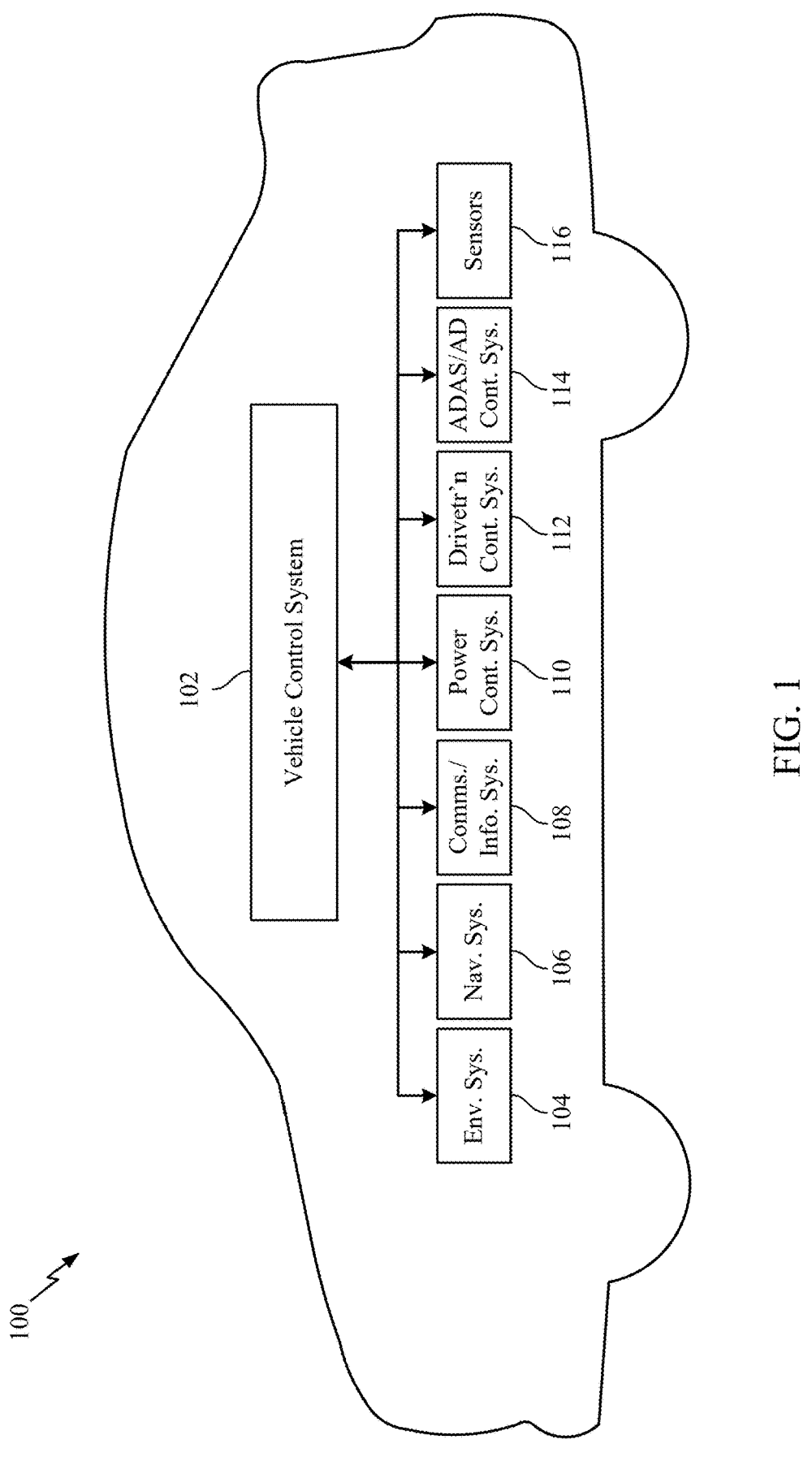
FIG. 1 is a diagram of an example vehicle with a vehicle control system, in which aspects of the present disclosure may be practiced.

Aspects of the present disclosure relate to performance state (P-state) monitoring of a processing device, such as a central processing unit (CPU) in a vehicle control system of a vehicle (e.g., an electric vehicle).

Power and thermal management issues are considerations in all segments of a vehicle control system. Optimizing the vehicle control system for a maximum performance at minimum power consumption is usually done using an operating system (OS) or system software to control hardware elements of the vehicle control system. Most modern OS's may use mechanisms defined in the Advanced Configuration and Power Interface (ACPI) standard for optimizing the vehicle control system.

An ACPI implementation may allow the processing device in the vehicle control system to be in different power-saving states or C-states (e.g., low power or idle states (e.g., for optimization of the power consumption at the processing device if the processing device does not have to execute any instructions)). In addition to the power-saving states, P-states (e.g., for optimization of a voltage and a processor/clock frequency during an operation of the processing device) are also provided.

In some cases, the processing device in the vehicle control system may be configured with a single or fixed P-state (e.g., a specific voltage value and a specific processor/clock frequency value) for operation. The fixed voltage value and the fixed processor/clock frequency value at the processing device for different workloads at the processing device may limit an ability of the processing device to optimize power consumption and performance of the processing device for the different workloads.

For example, when a given workload at the processing device in the vehicle control system may require a higher performance by the processing device, the fixed voltage value and the fixed processor/clock frequency value may not be sufficient to deliver the desired performance. For example, there may be a requirement for a voltage value and a processor/clock frequency value that may be higher than the fixed voltage value and the fixed processor/clock frequency value to execute the given workload.

In another example, when a given workload at the processing device in the vehicle control system may not require the higher performance by the processing device, the fixed voltage value and the fixed processor/clock frequency value may lead to a higher power consumption with no benefit (e.g., as the fixed voltage value and the fixed processor/clock frequency value may be much higher than a required voltage value and a required processor/clock frequency value to execute the given workload). The higher power consumption by the processing device of the vehicle may lead to a shorter time to a next charge of a battery of the vehicle.

To optimize the power consumption and the performance of the processing device for the different workloads at the processing device, in some cases, the processing device may be operated at different voltages and clock frequencies. For example, the processing device may operate at different combinations of voltage and clock frequency values corresponding to different P-states based on different workload requirements. That is, voltage levels and frequencies of clock signals that drive circuits of the processing device may be increased or decreased in response to a workload at the processing device. For example, the processing device may be able to request a specific P-state based on a current workload at the processing device. In some cases, an OS may request the specific P-state for the processing device based on the current workload at the processing device, and the processing device may accept or reject the request.

Accordingly, depending on the workload, the processing device may transition or switch from a higher P-state (e.g., a high voltage value and a high processor/clock frequency value) to a lower P-state (e.g., a low voltage value and a low processor/clock frequency value) or from the lower P-state to the higher P-state. The lower P-state at the processing device may help to reduce the power consumption, which may lead to a longer battery life of the vehicle.

In order to maintain safety compliance in the vehicle during the transition or switch from one P-state at the processing device to another P-state at the processing device, techniques proposed herein may update functions of the processing device in the vehicle control system to add various handshake and safety provisions for enabling the dynamic P-state control. For example, a signaling mechanism (referred to as an interface or handshake) may be provided between the processing device and a safety island (SAIL) device. The SAIL device may be configured for voltage and processor/clock frequency monitoring at the processing device and the signaling mechanism may be used to disable/enable the voltage and the processor/clock frequency monitoring during the transition from the one P-state at the processing device to the another P-state at the processing device.

The techniques proposed herein may allow for dynamic P-state changes at the processing device, and dynamic control (e.g., enable/disable and/or validate/invalidate) of the SAIL device to perform the voltage and processor/clock frequency monitoring during the P-state transitions at the processing device. The techniques proposed herein may also enable the SAIL device to be aware of the P-state transitions at the processing device (and therefore skip/avoid any false alerts from the SAIL device during the voltage and the processor/clock frequency monitoring during the P-state transitions at the processing device).

Example Vehicle Control System

FIG. 1 is a block diagram of an example vehicle 100 including a vehicle control system 102 and various sensors suitable for controlling certain systems, such as an advanced driver assistance system (ADAS), automated driving (AD), and/or in-vehicle infotainment (IVI). The vehicle 100 may refer to a means of carrying or transporting something (e.g., a person and/or cargo). In some aspects, the vehicle 100 may represent a motor vehicle, such as a car, van, truck, semi-trailer truck, motorcycle, motorbike, moped, electric bicycle, etc. The vehicle 100 may be a series production road vehicle having safety-related systems that include one or more electrical and/or electronic systems, as further described herein. The vehicle 100 may use an internal combustion engine, an electric motor, or a hybrid propulsion system (e.g., a combination of an engine and an electric motor) for propulsion. In some cases, the vehicle 100 may have one or more electrical and/or electronic systems that comply with certain functional safety standards, such as ISO 26262 as provided by the International Organization for Standardization (ISO).

Figure 2:
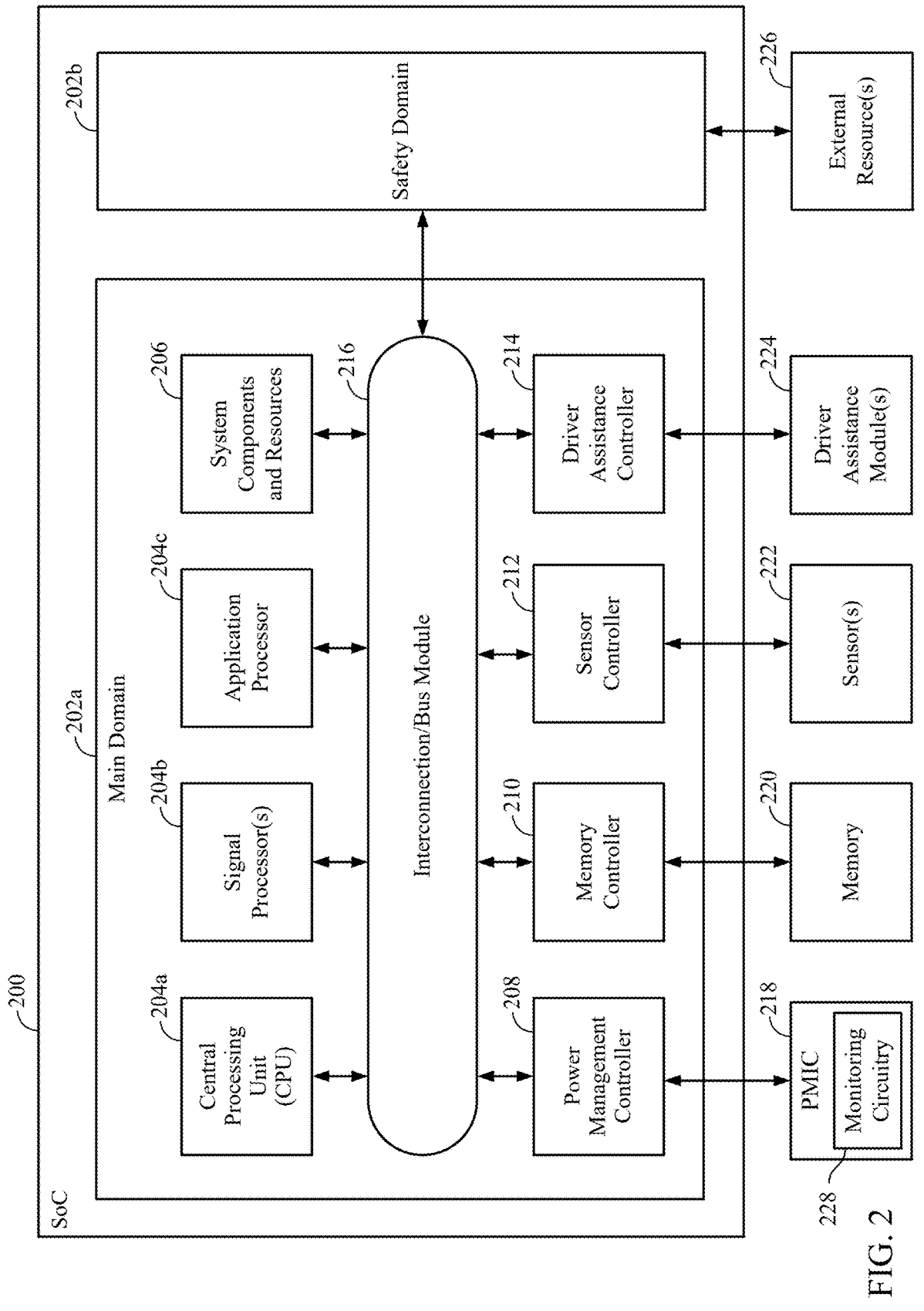
FIG. 2 is a block diagram of example components and interconnections in a system-on-a-chip (SoC), in which aspects of the present disclosure may be practiced.
Figure 3:
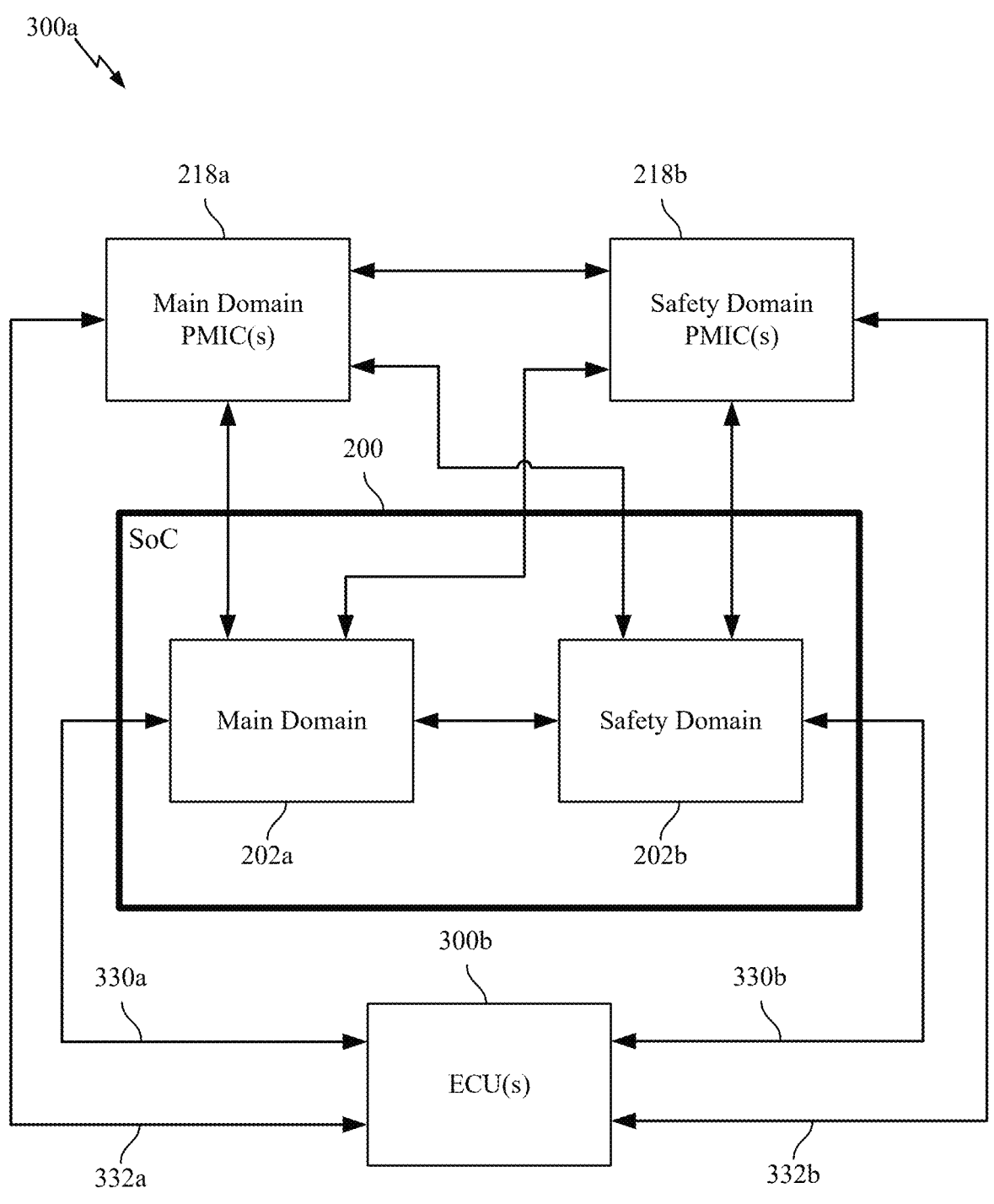
FIG. 3 is a block diagram of an example SoC-based electronic control unit (ECU) in communication with one or more other ECUs, in which aspects of the present disclosure may be practiced.

The vehicle 100 may include a vehicle control system 102, which may include one or more computing devices having system-on-a-chips (SoCs) (e.g., one or more electronic control units (ECUs)) as further described herein with respect to FIGS. 2 and 3. The vehicle control system 102 may be coupled to a variety of vehicle systems and subsystems, such as an environmental system 104 (e.g., an air conditioning and/or heating system), a navigation system 106, a communications and/or infotainment system 108, a power control system 110, a drivetrain control system 112, a driver assistance and/or automated driving control system 114, and/or a variety of sensors 116. Each vehicle system or subsystem may communicate with one or more other systems (and/or subsystem(s)) via one or more communication links, which may include wired communication links (e.g., a Controller Area Network (CAN) protocol compliant bus, Universal Serial Bus (USB) connection, Ethernet connection, universal asynchronous receiver-transmitter (UART), etc.) and/or wireless communication links (e.g., a Wi-Fi® link, Bluetooth® link, ZigBee® link, ANT+® link, etc.).

The vehicle control system 102 may perform certain operations associated with any of the vehicle systems and subsystems. For example, the vehicle control system 102 may control or initiate the power-on and/or shutdown sequence for any of the vehicle systems and subsystems. The vehicle control system 102 may monitor for errors associated with any of the vehicle systems and subsystems, and in some cases, the vehicle control system 102 may store the errors for vehicle diagnostics. In response to any errors detected, the vehicle control system 102 may perform certain actions, such as shutting down the affected system or transferring some of the affected operations to be performed at a different vehicle system. The vehicle control system 102 may monitor the power levels supplied to any of the vehicle systems and subsystems and ensure that the power levels supplied satisfy the operating specifications for any of the vehicle systems and subsystems.

The environmental system 104 may control the cooling and/or heating systems associated with the vehicle 100. For example, the vehicle 100 may have an air conditioning system, a heating system, heated or cooled seat(s), and/or a heated steering wheel, and the environmental system 104 may adjust the temperature according to user (or default) settings for the respective cooling and/or heating components. The navigation system 106 may show the vehicle's location on a map and provide navigation information, such as directions to a destination, via a display and/or a speaker (neither shown).

The communications and/or infotainment system 108 may allow the user to access various information (e.g., navigation information, interior or exterior environmental information, ADAS information, etc.), applications, and/or entertainment or media content, such as music and/or videos. The communications and/or infotainment system 108 may allow the user to update or access settings associated with a variety of systems, such as the environmental system 104, the navigation system 106, ADAS, vehicle settings, etc. The communications and/or infotainment system 108 may allow the user and/or vehicle 100 to wirelessly communicate via an integrated modem of the vehicle or via the user's wireless communication device (e.g., a smartphone or tablet).

The power control system 110 may control the components that output power to move the vehicle, such as an internal combustion engine (e.g., adjusting the air-fuel ratio, boost pressure, valve timing, etc.), an electric power system (e.g., controlling regenerative braking, battery power output, battery charging, battery cooling, etc.), and/or a hybrid power system (e.g., controlling regenerative braking, switching between battery power and engine power, battery charging, battery cooling, etc.). The drivetrain control system 112 may control the various components of the vehicle 100 that deliver power to the drive wheels. For example, the drivetrain control system 112 may control gear shifting in an automatic transmission. For a four-wheel drive vehicle, the drivetrain control system 112 may control the power ratio applied to the front and rear drive wheels.

The driver assistance and/or automated driving control system 114 may control various driver assistance features and functions, such as adaptive cruise control, automated lane detection, lane departure warning, automated steering, automated braking, and automated collision avoidance. The driver assistance and/or automated driving control system 114 may control automated driving at various levels of automation, such as any of the Society of Automotive Engineers (SAE) levels 1 through 5.

The variety of sensors 116 coupled to the vehicle control system 102 may include a speedometer, a wheel speed sensor, a torquemeter, a turbine speed sensor, a variable reluctance sensor, a sonar system, a radar system, an air-fuel ratio meter, a water-in-fuel sensor, an oxygen sensor, a crankshaft position sensor, a curb feeler, a temperature sensor, a Hall effect sensor, a manifold absolute pressure sensor, various fluid sensors (e.g., engine coolant sensor, transmission fluid sensor, etc.), a tire-pressure monitoring sensor, a mass airflow sensor, a speed sensor, a blind spot monitoring sensor, a parking sensor, cameras, microphones, accelerometers, compasses, a global navigation satellite system (GNSS) receiver (e.g., a global positioning system (GPS) receiver or a Galileo receiver), and other similar sensors for monitoring physical or environmental conditions in and around the vehicle.

The aforementioned systems are presented merely as examples, and vehicles may include one or more additional systems that are not illustrated for clarity. Additional systems may include systems related to additional other functions of the vehicular system, including instrumentation, airbags, cruise control, other engine systems, stability control parking systems, tire pressure monitoring, antilock braking, active suspension, battery level and/or management, and a variety of other systems.

Example System-On-A-Chip

As used herein, the term "system-on-a-chip" (SoC) generally refers to an integrated electronic device comprising one or more integrated circuit (IC) dies (e.g., chiplets), which combines multiple electronic components (e.g., processors and/or memory) on a single substrate or in a single package. A single SoC may contain circuitry for digital, analog, mixed-signal, and/or radio-frequency functions. A single SoC may also include any number of general purpose and/or specialized processors (digital signal processors, modem processors, video processors, etc.), memory blocks (e.g., ROM, RAM, DRAM, flash, etc.), and resources (e.g., timers, voltage regulators, oscillators, etc.). A SoC may also include software for controlling the integrated resources and processors, as well as for controlling peripheral devices.

FIG. 2 is a block diagram of example components and interconnections in a SoC 200 suitable for implementing various aspects of the present disclosure. The SoC 200 may include multiple processing domains having, for example, at least one main domain 202a and at least one safety domain 202b (also referred to as a "safety island (SAIL)"). In the case of multiple main (or safety) domains, the main (or safety) domains may be similar to one another. For ease of description and illustration, the remainder of the disclosure may refer to a main domain 202a and a safety domain 202b, but the reader is to understand that there may be more than one main domain and/or more than one safety domain.

The main domain 202a may be configured to support (or be capable of performing) vehicle operations (e.g., driver assistance and/or automated driving operations, features, etc.) up to a specific automotive safety integrity level (ASIL), and the safety domain 202b may be configured to support (or be capable of performing) vehicle operations up to a lower, the same, or a higher ASIL than the main domain 202a. For example, the main domain 202a may be configured to support (or be capable of performing) vehicle operations up to an ASIL B, and the safety domain 202b may be configured to support vehicle operations up to an ASIL D.

In some cases, the main domain 202a may be configured to support (or be capable of performing) vehicle operations up to an ASIL A, B, C, or D, and the safety domain 202b may be configured to support vehicle operations up to a different ASIL than the main domain 202a. In certain cases, the main domain 202a and the safety domain 202b may be configured to support (or be capable of performing) vehicle operations at the same ASIL (e.g., ASIL D). The main domain 202a and the safety domain 202b may be configured to support (or be capable of performing) vehicle operations at different ASILs.

The ASILs may be defined in a specific safety standard, such as ISO 26262. For example, the ASILs may provide a risk classification scheme for certain electrical and electronic systems of road vehicles. ISO 26262 provides four ASILs including ASIL A, ASIL B, ASIL C, and ASIL D. ASIL D is the highest classification and corresponds to the highest level of safety measures for avoiding an unreasonable residual risk, and ASIL A is the lowest classification and corresponds to the lowest level of safety measures.

In certain aspects, the SoC 200 may be included in a computing device (e.g., an ECU) in a vehicle control system. The SoC 200 may control any of the systems described herein with respect FIG. 1. For example, the SoC 200 may be configured to control an ADAS/AD system, such as the driver assistance and/or automated driving control system 114 described herein with respect to FIG. 1. In certain aspects, the SoC 200 may be in communication with other ECU(s) in a vehicle control system, and the SoC 200 and/or a PMIC 218 may report errors associated with the SoC 200 to the other ECU(s), as further described herein with respect to FIG. 3. For example, the main domain 202a may control the environmental system, the infotainment system, and driver assistance features up to a certain ASIL, and the safety domain 202b may control driver assistance features up to a certain ASIL, which may typically be higher than the main domain 202a.

The main domain 202a and/or safety domain 202b may include a number of heterogeneous processors 204a-c (collectively referred to herein as "processors 204"), such as a central processing unit (CPU) 204a, signal processor(s) 204b (e.g., a digital signal processor, an image signal processor, a neural network signal processor, etc.), and/or an application processor 204c. Each processor 204 may include one or more cores, and each processor/core may perform operations independent of the other processors/cores. Each processor 204 may be part of a subsystem (not shown) including one or more processors, caches, etc. configured to handle certain types of tasks or computations. It should be noted that the main domain 202a and/or safety domain 202b may include additional processors (not shown) or may include fewer processors (not shown). The main domain 202a and/or safety domain 202b may include other processors (e.g., a graphics processing unit (GPU), a vision processing unit, etc.) in addition to or instead of those illustrated.

The main domain 202a and/or safety domain 202b may include system components and resources 206 for performing certain specialized operations, such as analog-to-digital conversions and/or wireless data transmissions. The system components and resources 206 may include components such as voltage regulators, oscillators, phase-locked loops (PLLs), modems, peripheral bridges, data controllers, system controllers, access ports, timers, and other similar components used to support the processors and software clients running on the SoC 200. The system components and resources 206 may include circuitry for interfacing with peripheral devices, such as cameras, electronic displays, wireless communication devices, external memory chips, etc.

The main domain 202a and/or safety domain 202b may further include a power management controller 208, a memory controller 210 (e.g., a dynamic random access memory (DRAM) memory controller and/or a non-volatile memory controller), a sensor controller 212, and/or a driver assistance controller 214. The main domain 202a and/or safety domain 202b may also include an input/output (IO) module (not shown) for communicating with resources external to the SoC, such as a clock and a voltage regulator, each of which may be shared by two or more of the internal SoC components. The IO module may include a general purpose IO (GPIO) interface, for example. In certain aspects, each of the main domain 202a and the safety domain 202b may have a separate clock and power supply to facilitate independent operability.

The processors 204 of the main domain 202a may be interconnected to the system components and resources 206, the power management controller 208, the memory controller 210, the sensor controller 212, the driver assistance controller 214, other system components, and/or the safety domain 202b via an interconnection/bus module 216, which may include an array of reconfigurable logic gates and/or implement a bus architecture (e.g., CoreConnect, advanced microcontroller bus architecture (AMBA), etc.). Communications may be provided by advanced interconnects, such as high performance networks-on-chip (NoCs).

The interconnection/bus module 216 may include or provide a bus mastering system configured to grant SoC components (e.g., processors, peripherals, etc.) exclusive control of the bus (e.g., to transfer data) for a set duration, number of operations, number of bytes, etc. In certain aspects, the interconnection/bus module 216 may include a direct memory access (DMA) controller (not shown) that enables components connected to the interconnection/bus module 216 to operate as a master component and initiate memory transactions. The interconnection/bus module 216 may implement an arbitration scheme to prevent multiple master components from attempting to drive the bus simultaneously.

The power management controller 208 may manage the power supplied to the main domain 202a from a PMIC 218, which may be representative of one or more PMIC(s). In some cases, the power management controller 208 may report errors associated with the main domain 202a and/or safety domain 202b to the PMIC 218, as further described herein. The power management and error monitoring control may be separate and independent between the main domain 202a and the safety domain 202b.

The memory controller 210 may be a specialized hardware module configured to manage the flow of data to and from a memory 220. The memory controller 210 may include logic for interfacing with the memory 220, such as selecting a row and column in a cell array of the memory 220 corresponding to a memory location, reading or writing data to the memory location, etc. The memory 220 may be an on-chip component (e.g., on the substrate, die, integrated chip, etc.) of the SoC 200, or alternatively (as shown) an off-chip component.

The sensor controller 212 may manage the sensor data received from various sensors 222, such as the sensors 116. The sensor controller 212 may include circuitry for interfacing with the sensors 222. For example, the sensor controller 212 may receive sensor data from a tire pressure monitoring system and/or a radar sensor used for adaptive cruise control.

The driver assistance controller 214 may control certain driver assistance functions via a driver assistance module 224 (e.g., one or more actuators, relays, switches, etc.). For example, the driver assistance controller 214 may control the adaptive cruise control by controlling actuators coupled to the engine and/or braking system. In some cases, the driver assistance controller 214 may perform automated steering by controlling actuators attached to the steering system. It will be appreciated that the driver assistance controller 214 is merely an example, and the main domain 202a and/or the safety domain 202b may include a controller that interfaces with automated driving components in addition to or instead of the driver assistance controller 214.

The SoC 200 may also include additional hardware and/or software components that are suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, temperature, etc.), cameras, compasses, GPS receivers, communications circuitry (e.g., Bluetooth®, wireless local area network (WLAN), Long Term Evolution (LTE), Fifth Generation New Radio (5G NR), etc.), and other well-known components (e.g., accelerometer, etc.) of modern electronic devices.

Each of the processing domains may operate independently of the other domains. In some cases, each of the processing domains may be coupled to separate and independent external resources, such as a PMIC, memory, sensor(s), and driver assistance module(s). A particular external resource may be designed in accordance with an ASIL corresponding to the particular ASIL associated with the main domain 202a and/or the safety domain 202b to which the external resource is coupled. For example, the PMIC 218 may have the same ASIL as the main domain 202a, and the PMIC that provides power to the safety domain 202b may have the same ASIL as the safety domain 202b. The safety domain 202b may include the same or different processing resources and components as the main domain 202a as described herein with respect to the main domain 202a. For example, the safety domain 202b may include the processors 204, the system components and resources 206, the power management controller 208, the memory controller 210, the sensor controller 212, and the driver assistance controller 214. The safety domain 202b may be coupled to certain external resource(s) 226, which may be representative of a PMIC, memory, sensors, and/or driver assistance module, for example, as described herein with respect to the main domain 202a.

In addition to the SoC 200 discussed above, various aspects may be implemented in a wide variety of computing systems, which may include a single processor, multiple processors, multicore processors, or any combination thereof. Various aspects described herein may also be implemented in systems that employ more than one SoC. For example, a SoC-based ECU may include multiple SoCs (e.g., SoCs 200) configured to monitor the safety of a vehicle control system (e.g., vehicle control system 102). In these examples, each of the multiple SoC(s) may include different numbers of main domains and/or safety domains.

Example Safety Monitoring of SoC

FIG. 3 is a block diagram of an example SoC-based ECU 300a in communication with one or more other ECUs 300b, for example, for safety monitoring. In this example, the ECU 300a and the other ECU(s) 300b may operate in a vehicle control system and/or any vehicle system or subsystem, as described herein with respect to FIG. 1. The ECU 300a may perform some vehicle control operations (e.g., infotainment, environmental, ADAS, etc.), and the other ECU(s) 300b may perform some vehicle control operations (e.g., system wide controls, engine controls, drivetrain controls, other ADAS features, etc.). As an example, the ECU 300a may be an ADAS ECU. The ECU 300a may include the SoC 200 and corresponding external resources as described herein with respect to FIG. 2. In some aspects, the other ECU(s) 300b may include a SoC-based ECU, such as the SoC 200 and corresponding external resources as described herein with respect to FIG. 2.

The main domain 202a may operate independently of the safety domain 202b with independent external resources. For example, the main domain 202a may receive power from main domain PMIC(s) 218a, and the safety domain 202b may receive power from safety domain PMIC(s) 218b, which are different from the main domain PMIC(s) 218a and may provide independent power. Such a power architecture may allow the main domain 202a to operate even while the safety domain 202b is shut down or in a low power state, or vice versa. In some cases, the safety domain 202b may be operational to monitor the main domain 202a for errors.

Any of the main domain 202a, the safety domain 202b, the main domain PMIC(s) 218a, and/or the safety domain PMIC(s) 218b may perform self-error detection, where the component may detect an error that occurs at the component. For example, the main domain 202a may detect an error that occurs at the main domain 202a. These components may also perform redundant error detection as further described herein, where the component may detect an error that occurs at another component. For example, the safety domain 202b may detect an error that occurs at the main domain 202a, or vice versa. The safety domain 202b may monitor a safety subsystem of the main domain 202a for errors. The ECU 300a may use a redundant error propagation scheme, where any errors detected within safety subsystems are routed to the main domain 202a and the safety domain 202b. For example, the safety domain PMIC(s) 218b may notify the main domain 202a of the occurrence of an error associated with the safety domain 202b or the occurrence of an error within the safety domain PMIC(s) 218b.

The main domain 202a may be in communication with the safety domain 202b, the main domain PMIC(s) 218a, and/or the safety domain PMIC(s) 218b. Any of the safety domain 202b, the main domain PMIC(s) 218a, and/or the safety domain PMIC(s) 218b may monitor for errors associated with the main domain 202a. An error associated with the main domain 202a may include an error occurring at the main domain 202a or at any of the external resources (e.g., PMIC, memory, sensors, driver assistance modules, etc.) associated with the main domain 202a. In some cases, the main domain 202a may notify the safety domain 202b, the main domain PMIC(s) 218a, and/or the safety domain PMIC(s) 218b of the occurrence of an error associated with the main domain 202a.

In certain cases, the safety domain 202b, the main domain PMIC(s) 218a, and/or the safety domain PMIC(s) 218b may detect the error associated with the main domain 202a. The safety domain 202b, the main domain PMIC(s) 218a, and/or the safety domain PMIC(s) 218b may detect if the main domain 202a has suspended operations or is unresponsive. For example, the safety domain 202b, the main domain PMIC(s) 218a, and/or the safety domain PMIC(s) 218b may detect that the main domain 202a has stopped outputting a watchdog timer or is unresponsive to a challenge in a challenge-response exchange with the main domain 202a. A watchdog timer, a heartbeat, and/or challenge-response operation may be implemented between the main domain 202a and any of the safety domain 202b, the main domain PMIC(s) 218a, and/or the safety domain PMIC(s) 218b to ensure detection of the main domain 202a getting hung, suspending an operation, or being unresponsive. As an example, the safety domain 202b may request the main domain 202a to perform a calculation and provide the safety domain 202b with the result. If the main domain 202a provides the wrong result or is unresponsive, the safety domain 202b may detect the occurrence of an error at the main domain 202a.

The safety domain 202b may be in communication with the main domain 202a, the safety domain 202b, and/or the safety domain PMIC(s) 218b. Any of the main domain 202a and the safety domain PMIC(s) 218b may monitor for errors associated with the safety domain 202b. An error associated with the safety domain 202b may include an error occurring at the safety domain 202b or at any of the external resources associated with the safety domain 202b. In some cases, the safety domain 202b may notify the main domain 202a and/or the safety domain PMIC(s) 218b of the occurrence of an error associated with the safety domain 202b (e.g., to enable the ECU 300b to take appropriate action in response). In certain cases, the main domain 202a and/or the safety domain PMIC(s) 218b may detect the error associated with the safety domain 202b, for example, based on a watchdog operation and/or challenge-response operation.

The main domain 202a and the safety domain 202b may be in communication with the other ECU(s) 300b via separate buses 330a, 330b (collectively referred to herein as "buses 330"). The buses 330 may include a wired communication link (e.g., a CAN bus, a USB connection, an Ethernet connection, etc.) and/or a wireless communication link (e.g., a Wi-Fi® link, Bluetooth® link, ZigBee® link, ANT+® link, etc.). The buses 330 may provide redundant communication paths to the other ECU(s) 300b. Error information associated with the SoC 200 may be propagated via the first bus 330a from the main domain 202a to the other ECU(s) 300b, where error information associated with the SoC 200 may include an error occurring at the main domain 202a, the safety domain 202b, or at any of the external resources associated with the main domain 202a and/or the safety domain 202b. Error information associated with the SoC 200 may be propagated via the second bus 330b from the safety domain 202b to the other ECU(s) 300b.

In some cases, the main domain 202a and/or safety domain 202b may notify the other ECU(s) 300b of the occurrence of an error associated with the main domain and/or the safety domain 202b via the buses 330. In certain cases, the other ECU(s) 300b may detect the error associated with the main domain 202a and/or the safety domain 202b via the buses 330, for example, based on a watchdog operation and/or a challenge-response operation.

The main domain PMIC(s) and/or the safety domain PMIC(s) 218b may be in communication with the other ECU(s) 300b via communication links 332a, 332b (collectively referred to herein as "communication links 332"), such as a bus or one or more input/output (I/O) interfaces (e.g., I/O pins). The safety domain PMIC(s) 218b may be in communication with the main domain PMIC(s) 218a. Power-on and/or shutdown sequencing signals may be received at the main domain PMIC(s) 218a and/or the safety domain PMIC(s) 218b from the other ECU(s) 300b. The main domain PMIC(s) 218a and/or the safety domain PMIC(s) 218*b* may obtain a power-on instruction and/or a shutdown instruction from the other ECU(s) 300*b*. In certain cases, the main domain PMIC(s) 218*a* and/or the safety domain PMIC(s) 218*b* may receive, from the other ECU(s) 300*b*, an indication to perform a fast shutdown, for example, due to a sudden loss of power from an external power supply. Such an indication may be routed to a dedicated control pin of the main domain PMIC(s) 218*a* and/or the safety domain PMIC(s) 218*b*. Input supply monitoring for the PMIC(s) 218*a*, 218*b* may be performed externally either through an ASIL-rated pre-regulator or some other entity (e.g., the other ECU(s) 300*b*). The input supply to the PMIC(s) 218*a*, 218*b* may be ensured to be within the specifications associated with the PMIC(s) 218*a*, 218*b*.

In some cases, the safety domain PMIC(s) 218*b* may indicate to the main domain PMIC(s) 218*a* to power on or shut down the main domain 202*a* in response to the instruction(s). The main domain PMIC(s) 218*a* and the safety domain PMIC(s) 218*b* may also power on or shut down the main domain 202*a* and/or the safety domain 202*b* in response to the instruction(s).

The safety domain PMIC(s) 218*b* may receive an indication of an error associated with the SoC 200 from the main domain 202*a*, the safety domain 202*b*, and/or the main domain PMIC(s) 218*a*. The safety domain PMIC(s) 218*b* may notify the other ECU(s) 300*b* of the occurrence of an error associated with the main domain 202*a*, the main domain PMIC(s) 218*a*, and/or the safety domain 202*b* via the communication link 332*b*. In some cases, the other ECU(s) 300*b* may detect the occurrence of an error associated with the main domain 202*a*, the main domain PMIC(s) 218*a*, and/or the safety domain 202*b* via the communication link 332*b*, for example, based on a watchdog operation and/or a challenge-response operation.

In response to detecting an error associated with the main domain 202*a* and/or the safety domain 202*b*, the other ECU(s) 300*b* may be notified of the error by any of the main domain 202*a*, the safety domain 202*b*, and/or the safety domain PMIC(s) 218*b*. The other ECU(s) 300*b* may take corrective action based on the error. For example, the other ECU(s) 300*b* may instruct the SoC 200 to shut down any of the main domain 202*a* and the safety domain 202*b*, and the other ECU(s) 300*b* may operate the vehicle without the operations performed by the ECU 300*a* or taking over all or some of the operations performed by the ECU 300*a*. In response to detecting the error, the other ECU(s) 300*b* may operate according to a specific safety policy, for example, designed by the original equipment manufacturer (OEM) of the vehicle. In certain aspects, when the SoC 200 is unresponsive to commands, the ECU(s) 300*b* may drive shutdown of the SoC 200 by sending forceful shutdown (power-off) commands to the main domain PMIC(s) 218*a* and/or safety domain PMIC(s) 218*b*.

If the SoC 200 has a functional safety error or warning, the SoC 200 may notify the safety domain PMIC(s) 218*b* of the error via at least one error pin (e.g., at least one pin of a general purpose IO (GPIO)) routed from the SoC 200 to the safety domain PMIC(s) 218*b*. The error pin(s) are capable of communicating errors very quickly, without software intervention. In certain aspects, a communication bus may be used in addition or as an alternative to the error pin(s) for more detailed functional safety error or warning information communication. In response to detecting such an error, the SoC 200 may indicate, to the main domain PMIC(s) 218*a* and/or the safety domain PMIC(s) 218*b*, to shut down the SoC 200. In response to detecting such an error, the SoC 200 may notify the other ECU(s) 300 of the functional safety error or warning associated with the SoC 200 via any of the buses 330. In certain aspects, the main domain PMIC(s) 218*a* and/or the safety domain PMIC(s) 218*b* may also inform the ECU(s) 300 of the functional safety error and the subsequent action of shutting down the SoC 200.

In some cases, if the SoC 200 has a functional safety (FuSa) error or warning, the SoC 200 may notify the main domain PMIC(s) 218*a* of the error via error pins routed from the SoC 200 to at least two main domain PMIC(s) 218*a*. As the main domain 202*a* may use two or more PMICs, a primary PMIC and a secondary PMIC could be used for error monitoring. ASIL decomposition may be applied to achieve highest ASIL for error reporting through the error pins from the SoC 200 to the main domain PMIC(s) 218*a*. The SoC 200 may request the main domain PMIC(s) 218*a* and the safety domain PMIC(s) 218*b* to shut down the SoC 200.

A FuSa error or warning may include an error that can jeopardize the safety of future operations at a component, such as the main domain 202*a* or the safety domain 202*b*. The safety systems of the SoC 200 may monitor FuSa errors and/or FuSa warnings. A FuSa error may include an electrical and/or electronic fault detected through hardware or software safety mechanisms that leads to an uncorrectable error within safety systems of the SoC 200. The detected error can lead to failure and/or violation of a particular safety goal. A FuSa warning may include an electrical and/or electronic fault detected through hardware or software safety mechanisms within the safety systems of the SoC 200. The detected faults associated with a FuSa warning may be correctable faults or uncorrectable faults. A correctable fault associated with a FuSa warning can be detected, reported, and corrected by the safety systems of the vehicle (e.g., the other ECU(s) 300*b*) and/or the SoC 200. For example, a correctable fault may be a memory error handled by error correction code, such as a 1-bit error. An uncorrectable fault associated with a FuSa warning may be a known fault that can be handled by a safety policy of the OEM. For example, in response to detecting an uncorrectable fault, the safety policy may dictate providing a notification of the warning, such as a SoC temperature excursion warning (e.g., triggered by an on-die temperature of the SoC exceeding a warning threshold, but not the error threshold) or a SoC voltage excursion warning (e.g., triggered by an on-die voltage of the SoC exceeding a warning threshold, but not the error threshold). In certain aspects, the FuSa error or warning may include a systematic fault associated with software or hardware, such as a software bug or hardware design bug.

For example, a functional safety error or warning may include a miscalculation or faulty determination performed at the main domain 202*a* and/or the safety domain 202*b*, corrupted or malfunctioning memory coupled to the main domain 202*a* and/or the safety domain 202*b* (e.g., due to a memory bit being flipped), or an inability for the main domain 202*a* and/or the safety domain 202*b* to communicate with a sensor and/or a control device (e.g., an actuator, relay, switch, etc.). As another example, a functional safety error may include a malfunction occurring at a sensor (e.g., corrupted data for the measurements) or a control device (e.g., a stuck actuator or non-operational relay).

The safety domain 202*b* may perform watchdog operations and/or challenge-response operations for the main domain 202*a* to detect if the main domain 202*a* suspends an operation or becomes hung in an operation or unresponsive. In response to detecting such an error, the safety domain 202*b* may notify the other ECU(s) 300*b* of the error associated with the main domain 202*a*. In some cases, the safety domain 202*b* may indicate, to the main domain PMIC(s) 218*a*, to shut down the main domain 202*a*, and the safety domain 202*b* may continue operating without the main domain 202*a*. The safety domain 202*b* may be functionally isolated from the main domain 202*a* to allow the safety domain 202*b* to operate independently of the main domain 202*a*. The safety domain PMIC(s) 218*b* and/or the other ECU(s) 300*b* may perform watchdog operations and/or challenge-response operations for the main domain 202*a* and/or the safety domain 202*b* to detect if the main domain 202*a* and/or the safety domain 202*b* suspends an operation or becomes hung in an operation or unresponsive.

If the main domain PMIC(s) 218*a* has a functional safety error or warning, the main domain PMIC(s) 218*a* may notify the safety domain 202*b* and/or the safety domain PMIC(s) 218*b*, for example, via at least one error pin routed from the main domain PMIC(s) 218*a* to the safety domain 202*b*, the safety domain PMIC(s) 218*b*, and/or the ECU(s) 300*b*. The communication of the functional safety error or warning from the main domain PMIC(s) 218*b* to the safety domain 202*b*, the safety domain PMIC(s) 218*b*, and/or the ECU(s) 300*b* may occur through one or more communication bus interfaces (e.g., Serial Peripheral Interface (SPI), UART, Inter-Integrated Circuit ($I^2C$), or the like) in addition to the error pin(s), or instead of the error pin(s) (e.g., via a communication interface from the PMIC(s) 218*b*. In response to detecting such an error, the main domain PMIC(s) 218*a* may drive the shutdown of the main domain 202*a*. A SoC-level shutdown may be performed with the safety domain PMIC(s) 218*b* driving the shutdown of the safety domain 202*b*. In certain aspects, the safety domain 202*b* may continue to operate to provide a degraded mode of operation without the main domain 202*a*. For certain aspects, the safety domain 202*b* may request the safety domain PMIC(s) 218*b* to shut down the safety domain 202*b*.

If the safety domain PMIC(s) 218*b* has a functional safety error or warning, the safety domain PMIC(s) 218*b* may notify the main domain 202*a* via at least one error pin routed from the safety domain PMIC(s) 218*b* to the main domain 202*a*. In certain aspects, the communication of the functional safety error or waring from the safety domain PMIC(s) 218*b* to the main domain 202*a* may occur through a communication bus interface (e.g., SPI, UART, $I^2C$, or the like) in addition or as an alternative to the error pin(s). Similarly, in certain aspects, a suitable communication interface may relay the error in the safety domain PMIC(s) 218*b* to the ECU(s) 300*b*. In response to detecting such an error, the main domain 202*a* may notify the other ECU(s) 300*b* of the error via the first bus 330*a*. The main domain 202*a* may indicate, to the main domain PMIC(s) 218*a*, to shut down the main domain 202*a*. The safety domain PMIC(s) 218*b* may shut down the safety domain 202*b*. In some cases, the main domain 202*a* may indicate, to the safety domain PMIC(s) 218*b*, to shut down the safety domain 202*b*.

If the main domain 202*a* has a functional safety error or warning, the main domain 202*a* may notify the safety domain PMIC(s) 218*b* of the error via an error pin routed from the SoC 200 to the safety domain PMIC(s) 218*b*. In response to detecting such an error, the safety domain PMIC(s) 218*b* may instruct the main domain PMIC(s) 218*a* to shut down the main domain 202*a*, and in some cases, the safety domain PMIC(s) 218*b* may notify the other ECU(s) 300*b* of the error via the communication link 332*b*. In response to detecting such an error, the SoC 200 may indicate to the main domain PMIC(s) 218*a* to shut down the main domain 202*a*. In response to detecting such an error, the safety domain 202*b* may notify the other ECU(s) 300*b* of the error via the second bus 330*b*. In some cases, the safety domain 202*b* may indicate, to the main domain PMIC(s) 218*a*, to shut down the main domain 202*a*, and the safety domain 202*b* may continue operating without the main domain 202*a* being operational. In certain cases, the safety domain 202*b* may continue operating without sending the shutdown instruction to the main domain PMIC(s) 218*a*.

If the safety domain 202*b* has a functional safety error or warning, the safety domain 202*b* may notify the safety domain PMIC(s) 218*b* via an error pin routed from the SoC 200 to the safety domain PMIC(s) 218*b*. In response to detecting such an error, the safety domain 202*b* may instruct the main domain 202*a* to shut down. In response to detecting such an error, the main domain 202*a* may notify the other ECU(s) 300*b* of the error associated with the safety domain 202*b*. The safety domain 202*b* may indicate, to the safety domain PMIC(s) 218*b*, to shut down the safety domain 202*b*. In some cases, the main domain 202*a* may not be able to continue operating without the safety domain 202*b* being operational.

The SoC 200 may be configured to communicate with the other ECU(s) 300*b* via at least one of the first bus 330*a*, the second bus 330*b*, the main domain PMIC(s) 218*a*, and/or the safety domain PMIC(s) 218*b* without a vehicle interface processor (e.g., a microcontroller unit (MCU), also referred to as a "safety MCU" or external safety monitor) coupled between the safety domain 202*b* (or PMIC(s) 218) and the other ECU(s) 300*b*. The direct communication links between the SoC 200 (and the PMIC(s) 218) and other ECU(s) 300*b* may reduce the complexity and cost associated with the ECU 300*a*. In certain aspects, the direct communication links between the SoC 200 and other ECU(s) 300*b* may provide redundant communication paths allowing the SoC 200 and other ECU(s) 300*b* to communicate with each other, for example, in cases where one or more of the buses 330 (and/or one or more of the communication links 332) cannot be used for communications, or when certain safety subsystems within the SoC 200 or the PMIC(s) 218 detect a functional safety error.

Aspect of Safety Enhancement and Enabling of Dynamic P-State in a Processing Device of a Vehicle Aspects of the present disclosure relate to performance state (P-state) monitoring of a processing device (e.g., a central processing unit (CPU)) in a vehicle control system of a vehicle (e.g., an electric vehicle).

Advances in semiconductor processing and logic design have permitted an increase in an amount of logic that may be present on integrated circuit devices (e.g., of the vehicle control system). As a result, vehicle control system configurations have evolved from a single or multiple integrated circuits to multiple hardware threads, multiple processing devices, and/or multiple cores on individual integrated circuits. Additionally, as density of the integrated circuits has grown, power requirements for the vehicle control system have also escalated.

Power and thermal management issues are considerations in all segments of the vehicle control system. Optimizing the vehicle control system for a maximum performance at minimum power consumption is usually done using an operating system (OS) or a system software to control hardware elements of the vehicle control system. Most modern OS's may use the Advanced Configuration and Power Interface (ACPI) standard for optimizing the vehicle control system.

An ACPI implementation may allow the processing device in the vehicle control system to be in different power-saving states or C-states (e.g., low power or idle states (e.g., for optimization of the power consumption at the processing device if the processing device does not have to execute any instructions)), referred to as CO to Cn states, with CO being an active state and higher ones being deeper sleep states.

In addition to the power-saving states, P-states (e.g., for optimization of a voltage and a processor/clock frequency during an operation of the processing device) are also provided. For example, during execution of a code at the processing device in the vehicle control system, the processing device may optimize the power consumption through different P-states (e.g., corresponding to different voltage and processor/clock frequency values at the processing device).

Figure 4:
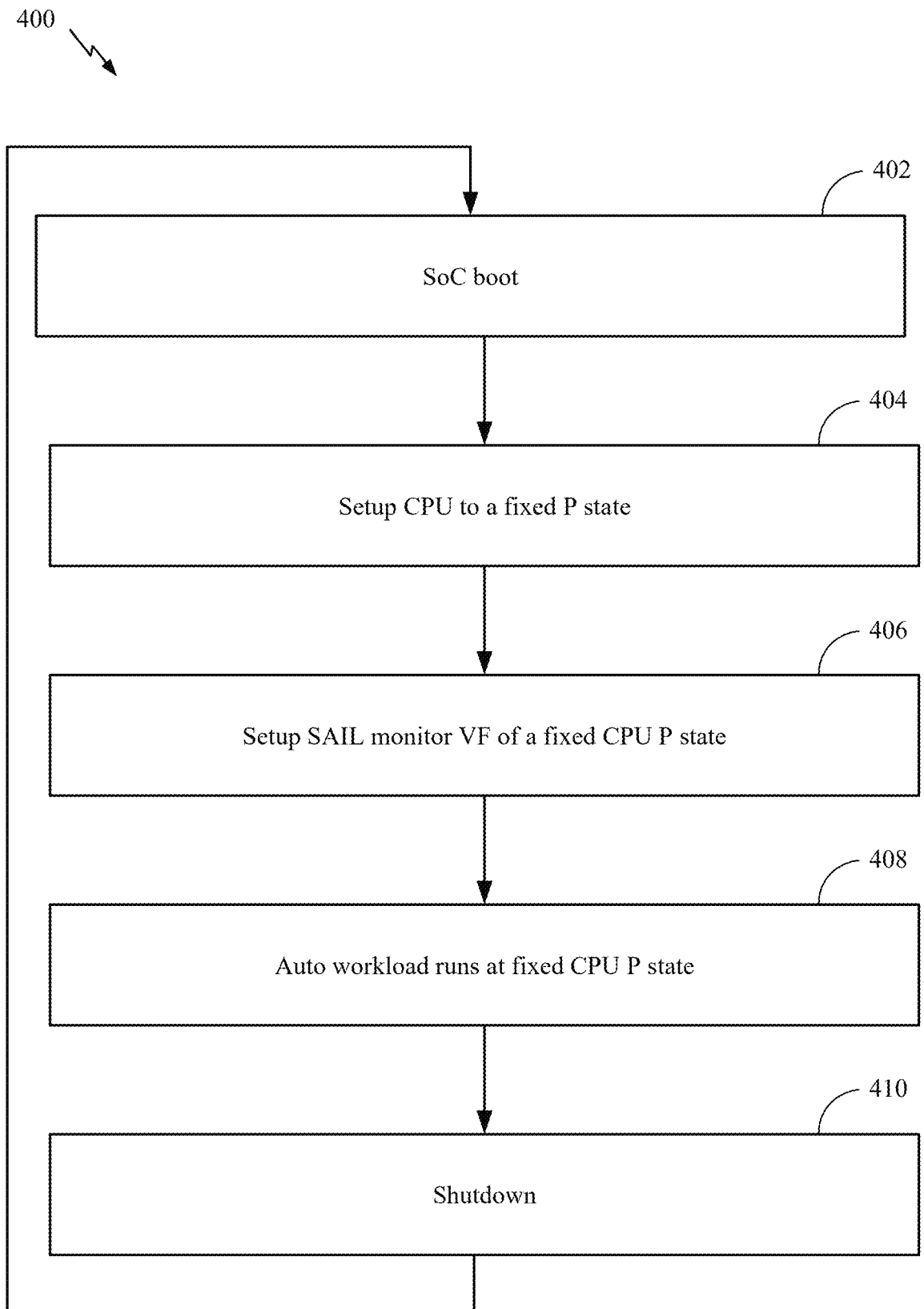
FIG. 4 is a diagram depicting operations for configuring a fixed performance state (P-state) at a processing device.

In some cases, the processing device in the vehicle control system may be configured with a single or fixed P-state (e.g., a specific voltage value and a specific processor/clock frequency value) for operation. For example, as illustrated in a method 400 of FIG. 4, at 402, the processing device (e.g., in a system-on-a-chip (SoC) such as the SoC 200 of FIG. 2) may initially be booted (i.e., the processing device may be started). At 402, the processing device is then configured with the fixed P-state. At 404, a safety island (SAIL) device may be set up to monitor a voltage value and a processor/clock frequency value at the processing device operating on the fixed P-state. At 408, the processing device may execute a workload while running at the specific voltage value and the specific processor/clock frequency value based on the fixed P-state. At 410, the processing device may be shut down. In such cases, the fixed voltage value and the fixed processor/clock frequency value at the processing device for different workloads at the processing device may limit an ability of the processing device to optimize power consumption and performance of the processing device for the different workloads.

For example, when a given workload at the processing device in the vehicle control system may require a higher performance by the processing device, the fixed voltage value and the fixed processor/clock frequency value may not meet the desired performance (e.g., as there may be a requirement for a voltage value and a processor/clock frequency value that may be higher than the fixed voltage value and the fixed processor/clock frequency value to execute the given workload).

In another example, when a given workload at the processing device in the vehicle control system may not require the higher performance by the processing device, the fixed voltage value and the fixed processor/clock frequency value may lead to a higher power consumption with no benefit (e.g., as the fixed voltage value and the fixed processor/clock frequency value may be much higher than a required voltage value and a required processor/clock frequency value to execute the given workload). The higher power consumption by the processing device of the vehicle may lead to a shorter time to a next charge of a battery of the vehicle. In some cases, the fixed P-state of the processing device in the vehicle control system may also lead to compromise in response time of the processing device and may make the vehicle less competitive.

To optimize the power consumption and the performance of the processing device for the different workloads at the processing device, in some cases, the processing device may be able to request or operate on different P-states based on different workloads (i.e., the processing device may have a dynamic P-state control). For example, when there is a high performance workload at the processing device, the processing device may operate on a higher P-state (i.e., a high voltage value and a high processor/clock frequency value). In another example, when there is a low performance workload at the processing device, the processing device may operate on a lower P-state (i.e., a low voltage value and a low processor/clock frequency value). Accordingly, depending on the workload, the processing device may transition or switch from the higher P-state to the lower P-state or from the lower P-state to the higher P-state. The lower P-state at the processing device may help to reduce the power consumption at the processing device, which may lead to a longer battery life of the vehicle.

In order to maintain safety compliance in the vehicle during the transition or switch from one P-state at the processing device to another P-state at the processing device, techniques proposed herein may update functions of the processing device in the vehicle control system of the vehicle to add various handshake and safety provisions for enabling the dynamic P-state control.

In one aspect, an interface/handshake may be provided between the processing device and the SAIL device to disable/enable voltage and processor/clock frequency monitoring during the transition from the one P-state at the processing device to another P-state at the processing device. For example, the processing device and the SAIL device handshake may allow the SAIL device to perform proper voltage and clock monitoring evaluation across the P-state transitions at the processing device.

In another aspect, an interface/handshake may be provided between the processing device and a software (e.g., the OS) to facilitate safety compliance P-state transitions at the processing device. For example, the processing device/software interface may allow dynamic P-state requests from the OS and close-loop confirmations of moving to a new P-state from the processing device.

The techniques proposed herein may allow for dynamic P-state changes at the processing device, dynamic control (e.g., enable/disable and/or validate/invalidate) of the SAIL device to perform the voltage and processor/clock frequency monitoring during the P-state transitions, enable the SAIL device to be temperature-aware during run-time monitoring of the voltage and the processor/clock frequency at the processing device, and enable the SAIL device to be aware of the P-state transitions at the processing device (and therefore skip/avoid any false alerts from the SAIL device during the voltage and the processor/clock frequency monitoring during the P-state transitions at the processing device). The techniques proposed herein may be further understood with reference to FIG. 5-FIG. 8.

Figure 5:
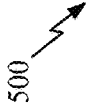
FIG. 5 is a block diagram of an example system for dynamic P-state monitoring of a processing device, in accordance with certain aspects of the present disclosure.

FIG. 5 is a block diagram 500 of an example system for P-state monitoring of a processing device or element, in accordance with certain aspects of the present disclosure. In one aspect, the system may be included in the vehicle 100 of FIG. 1. In another aspect, the system may perform some functions of the vehicle control system 102 of the vehicle 100 described in FIG. 1. In another aspect, the system may correspond to or is associated with the SoC-based ECU 300a in FIG. 3.

The system may include the processing device (e.g., in a SoC such as the SoC 200 of FIG. 2), a voltage controller, a clock controller, a temperature controller, and a monitoring device (e.g., such as the safety domain 202b of FIG. 2). The processing device, the voltage controller, the clock controller, the temperature controller, and/or the monitoring device may be coupled (e.g., electrically coupled) to each other. In some aspects, the system may include multiple processing devices, multiple voltage controllers, multiple clock controllers, multiple temperature controllers, and/or multiple monitoring devices coupled to each other.

The voltage controller may manage voltage supply at the processing device. For example, the voltage controller may include a controller module that may be configured to increase or decrease the voltage supply at the processing device based on a workload at the processor device.

The clock controller may manage a clock frequency at the processing device. For example, the clock controller may include a controller module that may be configured to increase or decrease the clock frequency (e.g., of clock signals) at the processing device based on the workload at the processor device.

The temperature controller monitors temperature at the processing device. The temperature controller may make reading of temperature values at the processing device available for a software associated with the processing device. The temperature controller may also make the temperature values at the processing device available for the monitoring device to monitor. The temperature at the processing device may increase or decrease as a consequence of workload power consumption at the processing device and/or a cooling solution (e.g., a heatsink, airflow, etc.) effectiveness on the processing device. In some aspects, the software may request a new lower P-state at the processing device when a higher temperature at the processing device is observed by the temperature controller or the monitoring device. The software may also direct higher performance workloads towards a processing device that may have a cooler temperature (e.g., colder) or may have some temperature margin.

The processing device may include a central processing unit (CPU) 204*a*, signal processor(s) 204*b* (e.g., a digital signal processor, an image signal processor, a neural network signal processor, etc.), and/or an application processor 204*c* of FIG. 2.

The processing device may include one or more processing cores. Each processing core may perform operations independent of other processing core. Each processing core may correspond to a single processing module that can execute instructions. The more processing cores the processing device has, the more tasks the processing device may handle simultaneously.

The processing device may determine a transition from a first P-state of the processing device to a second P-state of the processing device. The first P-state may indicate first values of a voltage and a clock frequency at the processing device. The second P-state may indicate second values of the voltage and the clock frequency at the processing device. The first values of the voltage and the clock frequency at the processing device are different from the second values of the voltage and the clock frequency at the processing device. For example, the first values of the voltage and the clock frequency at the processing device may be lower than the second values of the voltage and the clock frequency at the processing device. In another example, the first values of the voltage and the clock frequency at the processing device may be higher than the second values of the voltage and the clock frequency at the processing device.

In one aspect, the processing device may determine a change in the workload at the processing device. The processing device may then transition from the first P-state of the processing device (e.g., which is a current P-state) to the second P-state of the processing device (e.g., which is a new P-state), in response to the determined change in the workload at the processing device. The new P-state values may be based on the workload.

In another aspect, the processing device may receive a request (e.g., from the vehicle control system 102 of FIG. 1) to transition from the first P-state of the processing device to the second P-state of the processing device. The processing device may then transition from the first P-state of the processing device to the second P-state of the processing device, in response to the received request.

The processing device may transmit an indication to the monitoring device that the processing device is transitioning to the second P-state from the first P-state. In one example, the processing device may transmit the indication to the monitoring device after transitioning to the second P-state from the first P-state is completed. In another example, the processing device may transmit the indication to the monitoring device prior to transitioning to the second P-state from the first P-state, and the indication may indicate that the transitioning to the second P-state from the first P-state will occur shortly.

The processing device may enable the monitoring device to monitor a voltage value and/or a clock frequency value at the processing device during a first period, which may correspond to a time period for the transition from the first P-state of the processing device to the second P-state of the processing device. In some aspects, the processing device may disable the monitoring device to not monitor the voltage value and/or the clock frequency value at the processing device during the transition from the first P-state of the processing device to the second P-state of the processing device.

The processing device may enable the monitoring device to monitor a voltage value and/or a clock frequency value at the processing device during a second period, which may correspond to a time period of the second P-state of the processing device. In some aspects, the processing device may disable the monitoring device to not monitor the voltage value and/or the clock frequency value at the processing device during the second P-state of the processing device.

The processing device may enable the monitoring device to monitor a voltage value and/or a clock frequency value at the processing device during the first P-state of the processing device. In some aspects, the processing device may disable the monitoring device to not monitor the voltage value and/or the clock frequency value at the processing device during the first P-state of the processing device.

The processing device may enable the monitoring device to monitor a temperature value at the processing device during the transition from the first P-state of the processing device to the second P-state of the processing device.

The processing device may enable the monitoring device to monitor a temperature value at the processing device during the second P-state of the processing device.

The processing device may enable the monitoring device to monitor a temperature value at the processing device during the first P-state of the processing device.

The monitoring device may generate and transmit one or more alert signals to the processing device, based on monitoring of the voltage value, the clock frequency value, and/or the temperature value at the processing device during different P-states.

In one aspect, the monitoring device may transmit the one or more alert signals to the processing device based on the voltage value and/or the clock frequency value at the processing device during the transition from the first P-state of the processing device to the second P-state of the processing device exceeding a first threshold. The first threshold may include predetermined voltage value and/or clock frequency value.

In another aspect, the monitoring device may transmit the one or more alert signals to the processing device based on the voltage value and/or the clock frequency value at the processing device during the second P-state of the processing device exceeding a second threshold. The second threshold may include predetermined voltage value and/or clock frequency value.

In certain aspects, when the one or more alert signals are received by the software (e.g., associated with the processing device) and/or generated by the monitoring device, the software may service the one or more alert signals to determine a status of the one or more alert signals and then assert proper actions. The proper action may include logging of the status of the one or more alert signals and start (or initiate) frequent monitoring (e.g., of the voltage value, the clock frequency value, and/or the temperature value at the processing device) actions. In cases of critical alert signals (e.g., alarms), the monitoring device and/or the software may choose to reset the processing device to clear errors and initialize the processing device to a known state.

In one aspect, the monitoring device may transmit the one or more alert signals to the processing device based on the temperature value at the processing device during the transition from the first P-state of the processing device to the second P-state of the processing device exceeding a third threshold. The third threshold may include a predetermined temperature value.

In another aspect, the monitoring device may transmit the one or more alert signals to the processing device based on the temperature value at the processing device during the second P-state of the processing device exceeding a fourth threshold. The fourth threshold may include a predetermined temperature value.

In certain aspects, the temperature value at the processing device may be a consequence of workload power consumption at the processing device and a cooling solution function (e.g., a heatsink, airflow, etc.) at the processing device. To lower temperature at the processing device, the software may need to move the workload around (e.g., from a hot core to a cold core) and/or reduce P-state values to lower the power consumption at the processing device.

Figure 6:
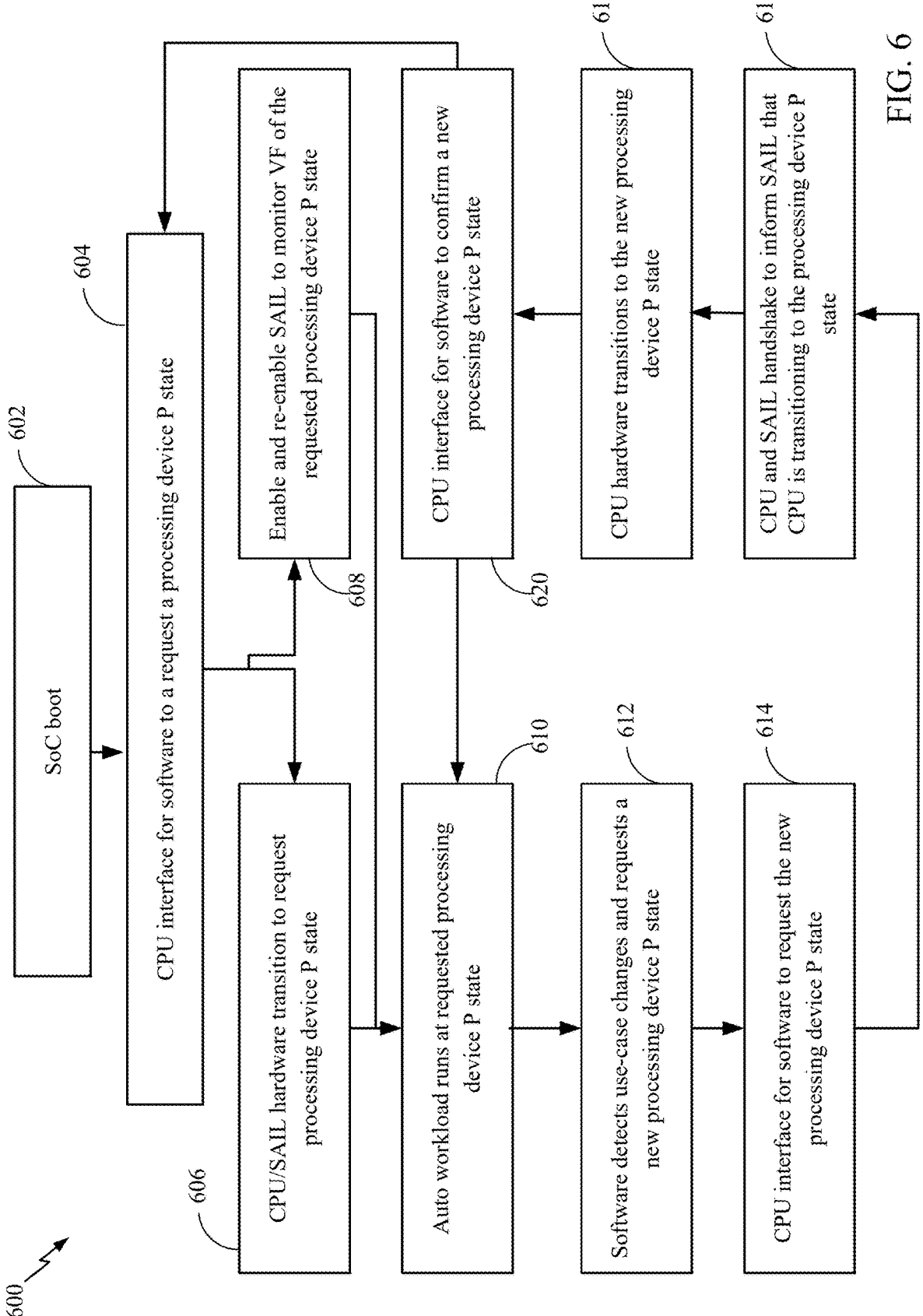
FIG. 6 is a diagram depicting example operations for dynamically changing a P-state at a processing device, in accordance with certain aspects of the present disclosure.

As illustrated in a method 600 of FIG. 6, at 602, the processing device (e.g., a CPU in the SoC such as the SoC 200 of FIG. 2) may initially be booted (i.e., the processing device may be started). At 604, the processing device may send a request to a software for a certain P-state. At 606, the processing device may move to the P-state (e.g., based on approval of the request by the software). At 608, the processing device may enable a SAIL device to monitor a voltage and a clock frequency at the processing device during a current P-state of the processing device. At 610, the processing device may run a workload at the current P-state. At 612, the software may detect a change in the workload at the processing device and may determine a new P-state for the processing device (e.g., which may be based on a latest workload at the processing device). At 614, the software may request the processing device to move to the new P-state. At 616, the processing device may indicate to the SAIL device that the processing device may transition to the new P-state. At 618, the processing device may transition to the new P-state from the current P-state. At 620, the processing device may send a confirmation indication to the software that the processing device has moved to the new P-state.

FIG. 7 shows an example of a method or operations 700 performed at a processing device, in accordance with certain aspects of the present disclosure. The method 700 may be performed by the processing device, as described herein with respect to FIG. 5.

Method 700 begins at 702 with determining to transition from a first P-state of the processing device to a second P-state of the processing device. The first P-state indicates first values of a voltage and a clock frequency at the processing device and the second P-state indicates second values of the voltage and the clock frequency at the processing device.

Method 700 then proceeds to 704 with enabling a monitoring device to monitor at least one of: a voltage value or a clock frequency value at the processing device during at least one of: a first period corresponding to the transition from the first P-state of the processing device to the second P-state of the processing device, or a second period corresponding to the second P-state of the processing device.

Method 700 then proceeds to 706 with receiving one or more alert signals from the monitoring device when at least one of: at least one of the voltage value or the clock frequency value at the processing device during the first period exceeds a first threshold, or the at least one of the voltage value or the clock frequency value at the processing device during the second period exceeds a second threshold.

In certain aspects, the method 700 further includes determining a change in a workload at the processing device; and performing the transition from the first P-state of the processing device to the second P-state of the processing device in response to the determined change in the workload at the processing device.

In certain aspects, the method 700 further includes receiving a request to transition from the first P-state of the processing device to the second P-state of the processing device; and performing the transition from the first P-state of the processing device to the second P-state of the processing device in response to the received request.

In certain aspects, the method 700 further includes disabling the monitoring device configured to monitor at least one of: the voltage value or the clock frequency value at the processing device during the transition from the first P-state of the processing device to the second P-state of the processing device.

In certain aspects, the method 700 further includes enabling the monitoring device to monitor at least one of the voltage value or the clock frequency value at the processing device during the first P-state of the processing device and the second P-state of the processing device.

In certain aspects, the method 700 further includes enabling the monitoring device to monitor a temperature value at the processing device during at least one of: the first period corresponding to the transition from the first P-state of the processing device to the second P-state of the processing device, or the second period corresponding to the second P-state of the processing device.

In certain aspects, the method 700 further includes receiving the one or more alert signals from the monitoring device when at least one of: the temperature value at the processing device during the first period exceeds a third threshold, or the temperature value at the processing device at the processing device during the second period exceeds a fourth threshold.

In certain aspects, the method 700 further includes transmitting an indication to the monitoring device that the processing device is transitioning to the second P-state from the first P-state.

In certain aspects, the method 700 further includes adjusting the at least one of the voltage value or the clock frequency value at the processing device during the first period to be below the first threshold, in response to receiving the one or more alert signals.

In certain aspects, the method 700 further includes adjusting the at least one of the voltage value or the clock frequency value at the processing device during the second period to be below the second threshold, in response to receiving the one or more alert signals.

FIG. 8 shows an example of a method or operations 800 performed at a monitoring device, in accordance with certain aspects of the present disclosure. The method 800 may be performed by the monitoring device, as described herein with respect to FIG. 5.

Method 800 begins at 802 with receiving an indication of a transition from a first P-state of a processing device to a second P-state of the processing device. The first P-state indicates first values of a voltage and a clock frequency at the processing device and the second P-state indicates second values of the voltage and the clock frequency at the processing device.

Method 800 then proceeds to 804 with transmitting one or more alert signals to the processing device when at least one of: at least one of a voltage value or a clock frequency value at the processing device during a first period corresponding to the transition from the first P-state of the processing device to the second P-state of the processing device exceeds a first threshold, or the at least one of the voltage value or the clock frequency value at the processing device during a second period corresponding to the second P-state of the processing device exceeds a second threshold.

In certain aspects, the method 800 further includes receiving another indication enabling the monitoring device to monitor at least one of: the voltage value or the clock frequency value at the processing device during the transition from the first P-state of the processing device to the second P-state of the processing device.

In certain aspects, the method 800 further includes receiving another indication disabling the monitoring device configured to monitor at least one of: the voltage value or the clock frequency value at the processing device during the transition from the first P-state of the processing device to the second P-state of the processing device.

In certain aspects, the method 800 further includes receiving another indication enabling the monitoring device to monitor at least one of the voltage value or the clock frequency value at the processing device during the first P-state of the processing device and the second P-state of the processing device.

The various operations of methods described above may be performed by any suitable means capable of performing the corresponding functions. The means may include various hardware and/or software component(s) and/or module(s), including, but not limited to a circuit, an application specific integrated circuit (ASIC), or a processor.

EXAMPLE CLAUSES

Implementation examples are described in the following numbered clauses:

Clause 1: A method at a processing device, comprising: determining to transition from a first performance state (P-state) of the processing device to a second P-state of the processing device, wherein the first P-state indicates first values of a voltage and a clock frequency at the processing device and the second P-state indicates second values of the voltage and the clock frequency at the processing device; enabling a monitoring device to monitor at least one of: a voltage value or a clock frequency value at the processing device during at least one of: a first period corresponding to the transition from the first P-state of the processing device to the second P-state of the processing device, or a second period corresponding to the second P-state of the processing device; and receiving one or more alert signals from the monitoring device when at least one of: at least one of the voltage value or the clock frequency value at the processing device during the first period exceeds a first threshold, or the at least one of the voltage value or the clock frequency value at the processing device during the second period exceeds a second threshold.

Clause 2: The method of clause 1, further comprising: determining a change in a workload at the processing device; and the determining to transition from the first P-state of the processing device to the second P-state of the processing device comprises performing the transition from the first P-state of the processing device to the second P-state of the processing device in response to the determined change in the workload at the processing device.

Clause 3: The method of any one of clauses 1-2, further comprising: receiving a request to transition from the first P-state of the processing device to the second P-state of the processing device; and the determining to transition from the first P-state of the processing device to the second P-state of the processing device comprises performing the transition from the first P-state of the processing device to the second P-state of the processing device in response to the received request.

Clause 4: The method of any one of clauses 1-3, further comprising disabling the monitoring device to monitor at least one of: the voltage value or the clock frequency value at the processing device during the transition from the first P-state of the processing device to the second P-state of the processing device.

Clause 5: The method of any one of clauses 1-4, further comprising enabling the monitoring device to monitor at least one of the voltage value or the clock frequency value at the processing device during the first P-state of the processing device and the second P-state of the processing device.

Clause 6: The method of any one of clauses 1-5, further comprising enabling the monitoring device to monitor a temperature value at the processing device during at least one of: the first period corresponding to the transition from the first P-state of the processing device to the second P-state of the processing device, or the second period corresponding to the second P-state of the processing device.

Clause 7: The method of clause 6, wherein the receiving further comprises receiving the one or more alert signals from the monitoring device when at least one of: the temperature value at the processing device during the first period exceeds a third threshold, or the temperature value at the processing device at the processing device during the second period exceeds a fourth threshold.

Clause 8: The method of any one of clauses 1-7, further comprising transmitting an indication to the monitoring device that the processing device is transitioning to the second P-state from the first P-state.

Clause 9: The method of any one of clauses 1-8, further comprising adjusting the at least one of the voltage value or the clock frequency value at the processing device during the first period to be below the first threshold, in response to receiving the one or more alert signals.

Clause 10: The method of any one of clauses 1-9, further comprising adjusting the at least one of the voltage value or the clock frequency value at the processing device during the second period to be below the second threshold, in response to receiving the one or more alert signals.

Clause 11: A method at a monitoring device, comprising: receiving an indication of a transition from a first P-state of a processing device to a second P-state of the processing device, wherein the first P-state indicates first values of a voltage and a clock frequency at the processing device and the second P-state indicates second values of the voltage and the clock frequency at the processing device; and transmitting one or more alert signals to the processing device when at least one of: at least one of a voltage value or a clock frequency value at the processing device during a first period corresponding to the transition from the first P-state of the processing device to the second P-state of the processing device exceeds a first threshold, or the at least one of the voltage value or the clock frequency value at the processing device during a second period corresponding to the second P-state of the processing device exceeds a second threshold.

Clause 12: The method of clause 11, further comprising receiving another indication enabling the monitoring device to monitor at least one of: the voltage value or the clock frequency value at the processing device during the transition from the first P-state of the processing device to the second P-state of the processing device.

Clause 13: The method of any one of clauses 11-12, further comprising receiving another indication disabling the monitoring device to monitor at least one of: the voltage value or the clock frequency value at the processing device during the transition from the first P-state of the processing device to the second P-state of the processing device.

Clause 14: The method of any one of clauses 11-13, further comprising receiving another indication enabling the monitoring device to monitor at least one of the voltage value or the clock frequency value at the processing device during the first P-state of the processing device and the second P-state of the processing device.

Clause 15: An apparatus, comprising: a memory comprising instructions; and one or more processors configured, individually or in any combination, to execute the instructions and cause the apparatus to perform a method in accordance with any one of Clauses 1-14.

Clause 16: An apparatus, comprising means for performing a method in accordance with any one of Clauses 1-14.

Clause 17: A non-transitory computer-readable medium comprising executable instructions that, when executed by one or more processors of an apparatus, cause the apparatus to perform a method in accordance with any one of Clauses 1-14.

Clause 18: A computer program product embodied on a computer-readable storage medium comprising code for performing a method in accordance with any one of Clauses 1-14.

ADDITIONAL CONSIDERATIONS

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects.

For example, if object A physically touches object B and object B touches object C, then objects A and C may still be considered coupled to one another-even if objects A and C do not directly physically touch each other. For instance, a first object may be coupled to a second object even though the first object is never directly physically in contact with the second object. The terms "circuit" and "circuitry" are used broadly and intended to include both hardware implementations of electrical devices and conductors that, when connected and configured, enable the performance of the functions described in the present disclosure, without limitation as to the type of electronic circuits.

The apparatus and methods described in the detailed description are illustrated in the accompanying drawings by various blocks, modules, components, circuits, steps, processes, algorithms, etc. (collectively referred to as "elements"). These elements may be implemented using hardware, for example.

One or more of the components, steps, features, and/or functions illustrated herein may be rearranged and/or combined into a single component, step, feature, or function or embodied in several components, steps, or functions. Additional elements, components, steps, and/or functions may also be added without departing from features disclosed herein. The apparatus, devices, and/or components illustrated herein may be configured to perform one or more of the methods, features, or steps described herein.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover at least: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

It is to be understood that the claims are not limited to the precise configuration and components illustrated above.

Various modifications, changes, and variations may be made in the arrangement, operation, and details of the methods and apparatus described above without departing from the scope of the claims.

The invention claimed is:

1. An apparatus, comprising:
a processing device configured to:
    determine to transition from a first performance state (P-state) of the processing device to a second P-state of the processing device, wherein the first P-state indicates first values of a voltage and a clock frequency at the processing device and the second P-state indicates second values of the voltage and the clock frequency at the processing device;
    enable a monitoring device to monitor at least one of: a voltage value or a clock frequency value at the processing device during at least one of:
        a first period corresponding to the transition from the first P-state of the processing device to the second P-state of the processing device, or
        a second period corresponding to the second P-state of the processing device; and
    receive one or more alert signals from the monitoring device when at least one of:
        at least one of the monitored voltage value or the monitored clock frequency value at the processing device during the first period exceeds a first threshold, or
        the at least one of the monitored voltage value or the monitored clock frequency value at the processing device during the second period exceeds a second threshold.

2. The apparatus of claim 1, wherein the processing device is further configured to:
    determine a change in a workload at the processing device; and
    perform the transition from the first P-state of the processing device to the second P-state of the processing device in response to the determined change in the workload at the processing device.

3. The apparatus of claim 1, wherein the processing device is further configured to:
    receive a request to transition from the first P-state of the processing device to the second P-state of the processing device; and
    perform the transition from the first P-state of the processing device to the second P-state of the processing device in response to the received request.

4. The apparatus of claim 1, wherein the processing device is further configured to disable the monitoring device to monitor at least one of: the voltage value or the clock frequency value at the processing device during the transition from the first P-state of the processing device to the second P-state of the processing device.

5. The apparatus of claim 1, wherein the processing device is further configured to enable the monitoring device to monitor at least one of the voltage value or the clock frequency value at the processing device during the first P-state of the processing device and the second P-state of the processing device.

6. The apparatus of claim 1, wherein the processing device is further configured to enable the monitoring device to monitor a temperature value at the processing device during at least one of:
    the first period corresponding to the transition from the first P-state of the processing device to the second P-state of the processing device, or the second period corresponding to the second P-state of the processing device.

7. The apparatus of claim 6, wherein the receive further comprises receive the one or more alert signals from the monitoring device when at least one of:
    the temperature value at the processing device during the first period exceeds a third threshold, or
    the temperature value at the processing device at the processing device during the second period exceeds a fourth threshold.

8. The apparatus of claim 1, wherein the processing device is further configured to transmit an indication to the monitoring device that the processing device is transitioning to the second P-state from the first P-state.

9. The apparatus of claim 1, wherein the processing device is further configured to adjust the at least one of the voltage value or the clock frequency value at the processing device during the first period to be below the first threshold, in response to receiving the one or more alert signals.

10. The apparatus of claim 1, wherein the processing device is further configured to adjust the at least one of the voltage value or the clock frequency value at the processing device during the second period to be below the second threshold, in response to receiving the one or more alert signals.

11. An apparatus, comprising:
a monitoring device configured to:
    receive an indication of a transition from a first performance state (P-state) of a processing device to a second P-state of the processing device, wherein the first P-state indicates first values of a voltage and a clock frequency at the processing device and the second P-state indicates second values of the voltage and the clock frequency at the processing device; and
    transmit one or more alert signals to the processing device when at least one of:
        at least one of a voltage value or a clock frequency value at the processing device during a first period corresponding to the transition from the first P-state of the processing device to the second P-state of the processing device exceeds a first threshold, or
        the at least one of the voltage value or the clock frequency value at the processing device during a second period corresponding to the second P-state of the processing device exceeds a second threshold.

12. The apparatus of claim 11, wherein the monitoring device is further configured to receive another indication enabling the monitoring device to monitor at least one of: the voltage value or the clock frequency value at the processing device during the transition from the first P-state of the processing device to the second P-state of the processing device.

13. The apparatus of claim 11, wherein the monitoring device is further configured to receive another indication disabling the monitoring device configured to monitor at least one of: the voltage value or the clock frequency value at the processing device during the transition from the first P-state of the processing device to the second P-state of the processing device.

14. The apparatus of claim 11, wherein the monitoring device is further configured to receive another indication enabling the monitoring device to monitor at least one of the voltage value or the clock frequency value at the processing device during the first P-state of the processing device and the second P-state of the processing device.

15. A method at a processing device, comprising:

determining to transition from a first performance state (P-state) of the processing device to a second P-state of the processing device, wherein the first P-state indicates first values of a voltage and a clock frequency at the processing device and the second P-state indicates second values of the voltage and the clock frequency at the processing device;

enabling a monitoring device to monitor at least one of: a voltage value or a clock frequency value at the processing device during at least one of:

a first period corresponding to the transition from the first P-state of the processing device to the second P-state of the processing device, or a second period corresponding to the second P-state of the processing device; and receiving one or more alert signals from the monitoring device when at least one of:

at least one of the monitored voltage value or the monitored clock frequency value at the processing device during the first period exceeds a first threshold, or the at least one of the monitored voltage value or the monitored clock frequency value at the processing device during the second period exceeds a second threshold.

16. The method of claim 15, further comprising:

determining a change in a workload at the processing device; and the determining to transition from the first P-state of the processing device to the second P-state of the processing device comprises performing the transition from the first P-state of the processing device to the second P-state of the processing device in response to the determined change in the workload at the processing device.

17. The method of claim 15, further comprising:

receiving a request to transition from the first P-state of the processing device to the second P-state of the processing device; and the determining to transition from the first P-state of the processing device to the second P-state of the processing device comprises performing the transition from the first P-state of the processing device to the second P-state of the processing device in response to the received request.

18. The method of claim 15, further comprising disabling the monitoring device to monitor at least one of: the voltage value or the clock frequency value at the processing device during the transition from the first P-state of the processing device to the second P-state of the processing device.

19. The method of claim 15, further comprising enabling the monitoring device to monitor at least one of the voltage value or the clock frequency value at the processing device during the first P-state of the processing device and the second P-state of the processing device.

20. The method of claim 15, further comprising enabling the monitoring device to monitor a temperature value at the processing device during at least one of:

the first period corresponding to the transition from the first P-state of the processing device to the second P-state of the processing device, or the second period corresponding to the second P-state of the processing device.

* * * * *